(12) United States Patent
Huang et al.

(10) Patent No.: US 10,602,511 B2
(45) Date of Patent: Mar. 24, 2020

(54) ONE MEASUREMENT GAP IN ASYNCHRONOUS DUAL CONNECTIVITY

(71) Applicant: Intel IP Corporation, Santa Clara, CA (US)

(72) Inventors: Rui Huang, Beijing (CN); Yang Tang, Pleasanton, CA (US); Candy Yiu, Portland, OR (US); Yujian Zhang, Beijing (CN)

(73) Assignee: Intel IP Corporation, Santa Clara, CA (US)

( * ) Notice: Subject to any disclaimer, the term of this patent is extended or adjusted under 35 U.S.C. 154(b) by 84 days.

(21) Appl. No.: 15/324,246

(22) PCT Filed: May 27, 2015

(86) PCT No.: PCT/US2015/032731
§ 371 (c)(1),
(2) Date: Jan. 5, 2017

(87) PCT Pub. No.: WO2016/022196
PCT Pub. Date: Feb. 11, 2016

(65) Prior Publication Data
US 2017/0201987 A1    Jul. 13, 2017

Related U.S. Application Data

(60) Provisional application No. 62/035,092, filed on Aug. 8, 2014.

(51) Int. Cl.
*H04W 72/04* (2009.01)
*H04W 24/02* (2009.01)
(Continued)

(52) U.S. Cl.
CPC ....... *H04W 72/0446* (2013.01); *H04W 16/32* (2013.01); *H04W 24/02* (2013.01); *H04W 16/12* (2013.01); *H04W 88/06* (2013.01)

(58) Field of Classification Search
CPC ....... H04W 16/32; H04L 5/001; H04L 5/0037
See application file for complete search history.

(56) References Cited

U.S. PATENT DOCUMENTS

2008/0189970 A1    8/2008  Wang et al.
2014/0349654 A1*  11/2014  Li ........................ H04W 36/20
                                                          455/437
(Continued)

FOREIGN PATENT DOCUMENTS

CN          103888987 A        6/2014

OTHER PUBLICATIONS

CATT, Measurement Gap Issues for Dual Connectivity, R2-141558, 3GPP TSG RAN (Year: 2014).*

(Continued)

*Primary Examiner* — Romani Ohri
(74) *Attorney, Agent, or Firm* — Schwabe, Williamson & Wyatt, P.C.

(57) ABSTRACT

In an embodiment, an apparatus to be employed in a user equipment (UE) is described. The apparatus includes configuration circuitry operable to determine, based on one or more configuration information messages, a measurement gap for a master evolved Node B (MeNB) that is operable to provide a master cell group (MCG) that is asynchronous with a secondary cell group (SCG) of a secondary evolved Node B (SeNB), wherein subframe boundaries of the MCG are different from subframe boundaries of the SCG; and radio frequency (RF) control circuitry operable to cause RF circuitry to be tuned, at a beginning of the measurement gap based on a subframe boundary of the MCG, to start inter-frequency measurements, wherein the RF circuitry is to be used to transmit or receive data in a serving cell of the MCG and in a serving cell of the SCG. Other embodiments are also described and claimed.

15 Claims, 6 Drawing Sheets

(51) Int. Cl.
*H04W 16/32* (2009.01)
*H04W 16/12* (2009.01)
*H04W 88/06* (2009.01)

(56) References Cited

U.S. PATENT DOCUMENTS

| | | | | |
|---|---|---|---|---|
| 2015/0016282 A1* | 1/2015 | Su | ...................... | H04W 36/0088 370/252 |
| 2015/0201338 A1* | 7/2015 | Gopal | ............... | H04W 26/0088 370/252 |
| 2016/0007310 A1* | 1/2016 | Yi | ...................... | H04W 56/0015 370/338 |
| 2016/0056939 A1* | 2/2016 | Kim | ...................... | H04L 5/0098 370/331 |
| 2016/0065302 A1* | 3/2016 | Rosa | .................... | H04B 7/2615 370/330 |
| 2016/0143027 A1* | 5/2016 | Kim | .................. | H04W 72/0426 370/329 |
| 2017/0034709 A1* | 2/2017 | Hapsari | ................. | H04W 16/14 |

OTHER PUBLICATIONS

Broadcom Corporation, Measurement gap configuration for Dual Connectivity, R2-141599, 3GPP TSG-RAN WG2 Meeting #85bis (Year: 2014).*

UALCOMM Incorporated, "Measurement gap configuration in Dual Connectivity," 3GPP TSG-RAN WG2 meeting #86, R2-142517, Agenda Item: 7.1.2, May 19-23, 2014, Seoul, KR, 3 pages (Year: 2014).*

CATT, CMCC; "Measurement Gap Issues for Dual Connectivity," 3GPP TSG RAN WG2 Meeting #86, R2-142342, Agenda Item: 7.1.3; Seoul, South Korea, May 19-23, 2014; 6 pages (Year: 2014).*

Samsung; "Measurement gap handling in SeNB in asynchronuous deployments," 3GPP TSG-RAN WG2 Meeting #87 R2-143080, Agenda Item: 7.1.3.2; Aug. 18-22, 2014, Dresden, Germany; 3 pages.

Samsung; "Discussion on per-UE measurement gap for DC," 3GPP TSG-RAN WG2 Meeting #86 R2-142242, Agenda Item: 7.1.2; May 19-23, 2014, Seoul, Korea; 6 pages.

International Search Report and Written Opinion for International Application No. PCT/US2015/032731 dated Sep. 24, 2015; 14 pages.

CATT, CMCC; "Measurement Gap Issues for Dual Connectivity," 3GPP TSG RAN WG2 Meeting #86, R2-142342, Agenda Item: 7.1.3; Seoul, South Korea, May 19-23, 2014; 6 pages.

Broadcom Corporation; "Measurement gap configuration for Dual Connectivity," 3GPP TSG-RAN WG2 Meeting #85bis R2-141599, Agenda Item: 7.1.2; Valencia, Spain, Mar. 31-Apr. 4, 2014; 6 pages.

Taiwan Patent Office; Office Action for Application No. 104121865 dated Nov. 15, 2016; 6 pages.

Taiwan Patent Office; Office Action for Application No. 104121865 dated Jun. 24, 2016; 13 pages.

Korean Patent Office—Notice of Preliminary Rejection dated Apr. 4, 2018 from Korean Patent Application No. 2017-7001635, 14 pages.

Japanese Patent Office—Notice of Reasons for Rejection dated Feb. 20, 2018 from Japanese Patent Application No. JP2017-506845, 8 pages Huawei et al., "Discussion on RRM measurement gap in DC scenario," 3GPP TSG-RAN WG4 Meeting #71AH, R4-71AH-0005, Agenda Item: 5.1, Jun. 24-26, 2014, Beijing, P.R.China, 2 pages.

Intel Corporation, " Further discussion on SFN timing difference in Dual connectivity," 3GPP TSG-RAN WG4 Meeting #71 RRM AH, R4-71AH-0077, Agenda Item: 5.1., Jun. 24-26, 2014, Beijing, P.R. China, 3 pages.

3GPP TS 36.133 V12.3.0 (Mar. 2014); "Technical Specification Group Radio Access Network; Evolved Universal Terrestrial Radio Access (E-UTRA); Requirements for support of radio resource management (Release 12);" 820 pages.

3GPP TS 36.331 V12.1.0 (Mar. 2014); "Technical Specification Group Radio Access Network; Evolved Universal Terrestrial Radio Access (E-UTRA); Radio Resource Control (RRC); Protocol specification (Release 12)," 356 pages.

Examination Report dated Sep. 25, 2017 from Australian Patent Application No. 2015298766, 4 pages.

Notice of Preliminary Rejection dated Sep. 28, 2017 from Korean Patent Application No. 2017-7001635, 13 pages.

Qualcomm Incorporated, "Measurement gap configuration in Dual Connectivity," 3GPP TSG-RAN WG2 meeting #86, R2-142517, Agenda Item: 7.1.2, May 19-23, 2014, Seoul, KR, 3 pages.

Huawei, Hisilicon, "RRM measurements for SCG in dual connectivity," Agenda Item: 7.1.3, 3GPP TSG-RAN WG2 Meeting #86, R2-142066, May 19-23, 2014, Seoul, Korea, 5 pages.

Taiwan Patent Office—Office Action dated Mar. 15, 2018 from Taiwan Divisional Application No. 106114325, 13 pages.

Office Action dated Feb. 1, 2018 from Russian Patent Application No. 2017104160, 13 pages.

NTT DOCOMO, "RRM requirements for Dual Connectivity," 3GPP TSG-RAN WG4 Meeting #71, R4-143336, Agenda item: 7.15.3, May 19-23, 2014, Seoul, Korea, 3 pages.

Extended European Search Report dated Jan. 23, 2018 from European Patent Application No. 15829552.7, 14 pages.

Intel Corporation, "Discussion on SFN timing difference in Dual connectivity," 3GPP TSG-RAN WG4 Meeting #71, R4-143028, Agenda Item: 7.15.3, May 19-23, 2014, Seoul, Korea, 7 pages.

* cited by examiner

ONE MEASUREMENT GAP IN ASYNCHRONOUS DUAL CONNECTIVITY

CROSS REFERENCES TO RELATED APPLICATIONS

This application is a national phase entry under 35 U.S.C. § 371 of International Application No. PCT/US2015/032731, filed May 27, 2015, entitled "ONE MEASUREMENT GAP IN ASYNCHRONOUS DUAL CONNECTIVITY", which claims priority from U.S. Provisional Application No. 62/035,092 entitled "ONE MEASUREMENT GAP IN ASYNCHRONOUS DC" filed on Aug. 8, 2014, of which are incorporated by reference herein their entireties.

TECHNICAL FIELD

Embodiments of the present disclosure generally relate to apparatus and method for wireless communications, and in particular to those for Long Term Evolution (LTE).

BACKGROUND ART

In LTE Release 12, 3rd Generation Partnership Project (3GPP) introduces the capability of dual connectivity (DC), which enables a given user equipment (UE) to consume radio resources provided by at least two different network points connected with non-ideal backhaul, for example, an X2 interface, and thus allows an improved network performance.

BRIEF DESCRIPTION OF THE DRAWINGS

Embodiments of the disclosure will be illustrated, by way of example and not limitation, in the figures of the accompanying drawings in which like reference numerals refer to similar elements.

DETAILED DESCRIPTION OF EMBODIMENTS

Various aspects of the illustrative embodiments will be described using terms commonly employed by those skilled in the art to convey the substance of their work to others skilled in the art. However, it will be apparent to those skilled in the art that many alternate embodiments may be practiced using portions of the described aspects. For purposes of explanation, specific numbers, materials, and configurations are set forth in order to provide a thorough understanding of the illustrative embodiments. However, it will be apparent to those skilled in the art that alternate embodiments may be practiced without the specific details. In other instances, well known features are omitted or simplified in order to avoid obscuring the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in an embodiment" is used repeatedly herein. The phrase generally does not refer to the same embodiment; however, it may. The terms "comprising," "having," and "including" are synonymous, unless the context dictates otherwise. The phrases "A or B" and "A/B" mean "(A), (B), or (A and B)."

Figure 1:
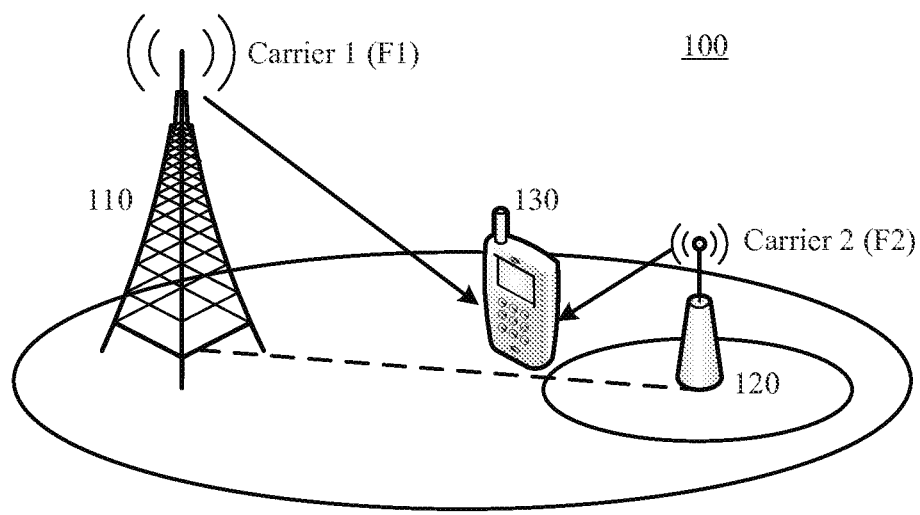
FIG. 1 illustrates a simplified wireless communication system in which embodiments of the disclosure can be implemented.

FIG. 1 illustrates a simplified wireless communication system 100 in which embodiments of the disclosure can be implemented. The system 100 includes a first eNodeB 110, a second eNodeB 120, and a UE 130. The first eNodeB 110 may be, for example, an eNodeB of a macro cell type in LTE network. The second eNodeB 120 may be an eNodeB of a small cell type, for example, a pico cell type. In an embodiment, the first eNodeB 110 may facilitate mobility management in the network, and the second eNodeB 120 may be provided for offloading purpose. In an embodiment, the first eNodeB 110 and the second eNodeB 120 may operate on different frequencies. In an embodiment, the first eNodeB 110 and the second eNodeB 120 may be connected with non-ideal backhaul, for example, an X2 interface.

The UE 130 may be any wireless communication apparatus that can be served by the first eNodeB 110 and the second eNodeB 120, including but not limited to, a cell phone, a laptop computer, a tablet device, a personal digital assistant (PDA), a gaming console, and the like. In the following description, embodiments of the disclosure will be described in such context that the UE 130 is a cell phone.

The system 100 may be provided with asynchronous dual-connectivity capability. In asynchronous dual-connectivity operation, the first eNodeB 110, which may also be referred to as master eNodeB (MeNB) 110, may be not synchronized with the second eNodeB 120, which may also be referred to as secondary eNodeB (SeNB) 120. In this case, MeNB 110 and SeNB 120 may have different system frame numbers (SFNs) respectively.

If the UE 130 is currently being served by MeNB 110 and, for example, is to be handed over to SeNB 120, a measurement may be performed prior to the handover to ensure a continuous user experience. The measurement may occur at a time that the UE 130 determines in a temporal measurement gap during which a radio frequency (RF) receiver in the UE 130 may be tuned to an operating frequency of SeNB 120 and data transmission/reception of UE 130 on the operating frequencies of MeNB 110 and SeNB 120 may be prohibited. The measurement gap may have a configuration specified in 3GPP Technical Specification "3rd Generation Partnership Project; Technical Specification Group Radio Access Network; Evolved Universal Terrestrial Radio Access (E-UTRA); Requirements for support of radio resource management (Release 12)" (TS 36.133 v12.4.0, Jul. 4, 2014, referred to as "TS 36.133 specification" hereinafter) and Technical Specification "3rd Generation Partnership Project; Technical Specification Group Radio Access Network; Evolved Universal Terrestrial Radio Access (E-UTRA); Radio Resource Control (RRC); Protocol specification (Release 12)" (TS 36.331 v12.2.0, Jul. 4,2014, referred to as "TS 36.331 specification" hereinafter). The above process applies also if the UE 130 is being served by SeNB 120.

Figure 2:
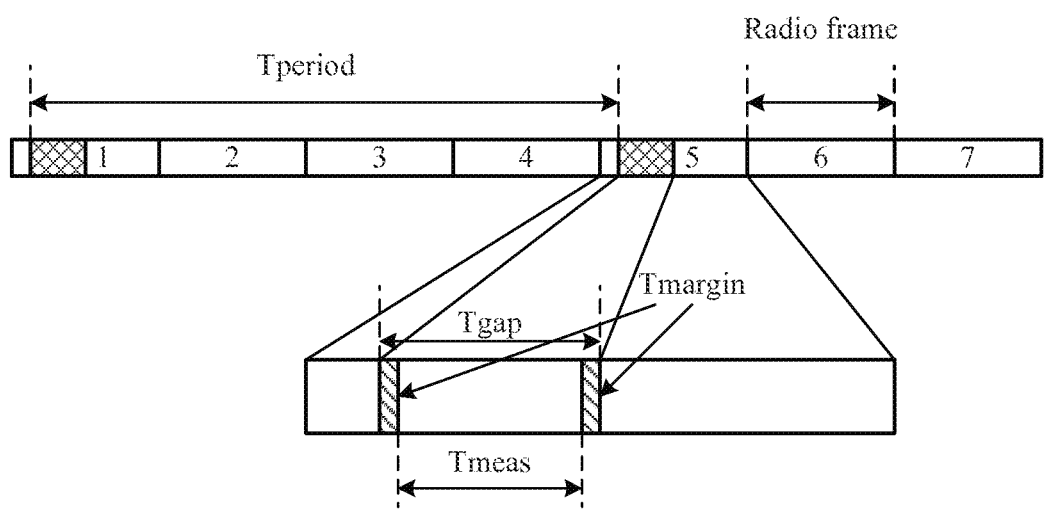
FIG. 2 shows a schematic of a frame structure including a measurement gap in accordance with various embodiments.

FIG. 2 shows a schematic of a frame structure including a measurement gap in accordance with various embodiments. In FIG. 2, seven consecutive radio frames are shown and numbered 1 to 7 in temporal order. Each radio frame spans 10 ms and is divided into 10 subframes of 1 ms. In FIG. 2, frames No. 1 and No. 5 each include a measurement gap shown by hatched regions. According to TS 36.133 specification, measurement gaps may occur regularly, and a measurement gap repetition period (MGRP) may be 40 ms or 80 ms. The MGRP is 40 ms in FIG. 2 as indicated by Tperiod. The measurement gap, as shown in the enlarged view in the lower portion, is a 6 ms period indicated by Tgap, and includes a time period (Tmeas) of 5 ms for the actual measurement and two margins (Tmargin), for example each of 0.5 ms, at both the beginning and the end of Tmeas. The margins may be provided for protective purpose because during these periods the RF receiver in the UE 130 may be tuning to and reconfigured for the frequency to be measured, and no data should be transmitted or received. During the subframes of FIG. 2 outside the measurement gaps, the UE 130 may receive data from or transmit data to the eNodeB that is serving the UE 130.

As mentioned above, MeNB 110 and SeNB 120 may have different SFNs. Due to this difference of SFN, discontinuous reception (DRX) and the measurement gap cannot be aligned in timing for a master cell group (MCG) associated with the MeNB 110 and secondary cell group (SCG) associated with the SeNB 120. Though MeNB 110 can align DRX and measurement gap occasions between MCG and SCG by acquisition of SFN and subframe timing difference between MeNB 110 and SeNB 120, this alignment may not be precise, and there could still be a difference between a subframe timing of MeNB 110 and that of SeNB 120. The difference can maximally be a half subframe, and either the MCG or the SCG may be ahead of the other.

Figure 3:
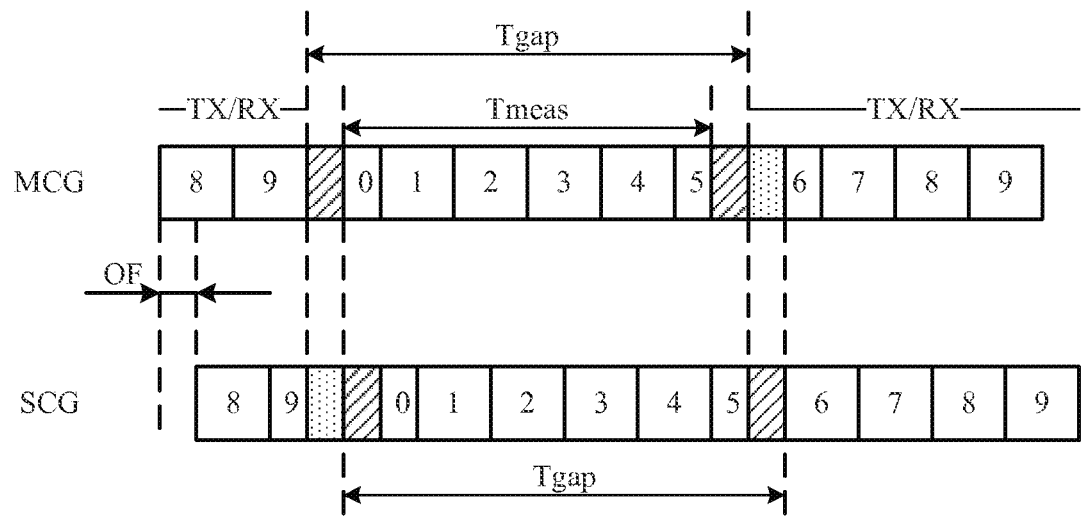
FIG. 3 illustrates exemplary subframe timings for master evolved Node B (MeNB) and secondary evolved Node B (SeNB) where master cell group (MCG) is ahead of secondary cell group (SCG) by a half subframe in accordance with various embodiments.

FIG. 3 illustrates exemplary subframe timings for MeNB and SeNB where MCG is ahead of SCG by a half subframe and this timing offset is indicated by OF. In the exemplary scenario of FIG. 3, data transmission/reception may be carried out in the two leading subframes (No. 8 and No. 9 of the first radio frame) and the four tail subframes (Nos. 6-9 of the second radio frame), and the measurement gap spans subframes Nos. 0-5 of the second radio frame. However, as can be seen from FIG. 3, due to the timing offset OF, the leading margin of the measurement gap (shown in hatching) for MCG actually overlaps the end of the data transmission/reception duration for SCG, and the tail margin of the measurement gap (shown also in hatching) for SCG overlaps the start of the subsequent data transmission/reception duration for MCG. As a result, interruption will occur in the data transmission/reception during the corresponding subframes (those filled with dots).

Figure 4:
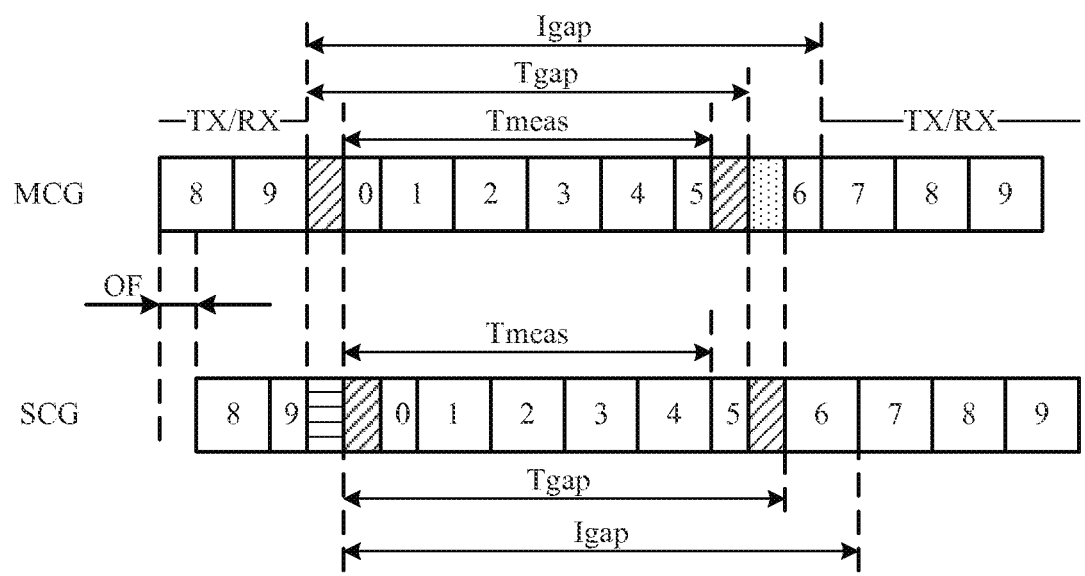
FIG. 4 shows a modified gap configuration where the interruption gap length is extended to 7 ms for both MCG and SCG in accordance with various embodiments.

FIG. 4 shows a modified gap configuration where an interruption gap having an interruption gap length, Igap, of 7 ms encompasses the measurement gaps, which have Tgaps of 6 ms, for both MCG and SCG in accordance with some embodiments. The interruption gaps may be gaps in which transmission/reception are prohibited on respective cell groups (similar to measurement gaps but not necessarily limited to Tmeas+Tmargin). With this modification, it can be seen that no interruption will occur in subframe No. 6 of MCG, because when the RF receiver is re-tuned at the tail margin of the measurement gap for SCG, the corresponding subframe of MCG (the one filled with dots) is still within its interruption gap and no data is being transmitted/received. On the other hand, the RF receiver has completed re-tuning and is ready for data transmission/reception at subframe No. 7 of MCG. However, if RF tuning is started separately when measuring MCG and SCG, for example the UE switches RF channel at the beginning of measurement gap of MCG and SCG separately, an interruption may still occur as shown in subframe No. 9 of the first subframe of SCG (the one filled with horizontal lines in FIG. 4).

Figures 5, 6:
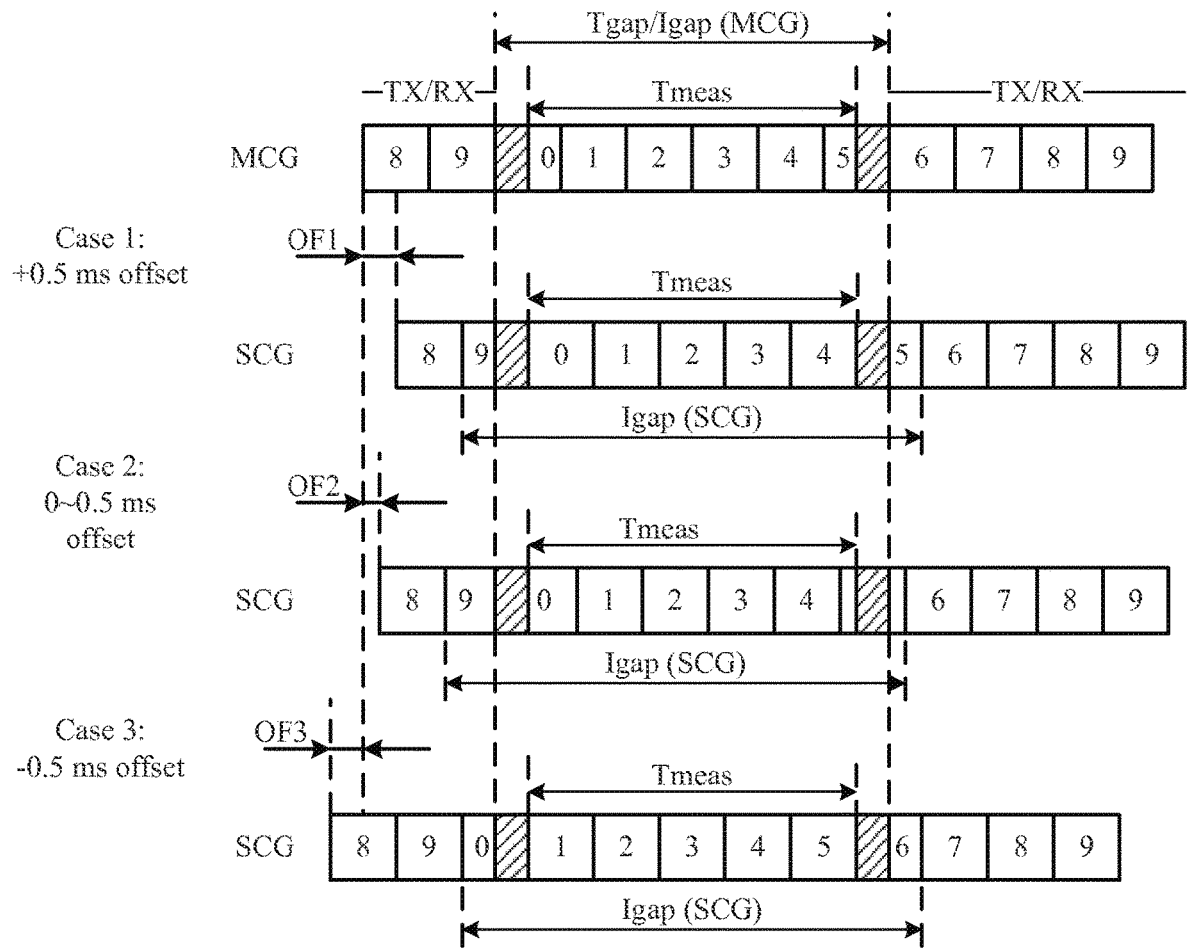
FIG. 5 illustrates a gap configuration in accordance with various embodiments of the disclosure.
FIG. 6 illustrates a method for wireless communication in accordance with various embodiments of the disclosure.

FIG. 5 illustrates a gap configuration in accordance with various embodiments of the disclosure. According to the embodiments, the interruption gap length for SCG is greater than that for MCG, and a starting point of the interruption gap for SCG is even with a starting point of the interruption gap for MCG or ahead of the starting point of the interruption gap for MCG by less than one subframe. In this embodiment, the measurement and interruption gaps of the MCG may be the same, while the interruption gap of the SCG may be larger than the measurement gap of the SCG. In the embodiments, the interruption gap for SCG may start not later than (e.g. earlier than, or simultaneously with), but end later than, the interruption gap for MCG. The embodiments of the disclosure thus allow measurement gap to be aligned between MCG and SCG. Specifically, the gap length of the measurement gaps for the MCG and SCG can be the same as that specified in the TS 36.133 specification, for example, 6 ms, while the gap length of the interruption gap for SCG may be extended to 7 ms, for example. In the exemplary scenario shown in FIG. 5, the measurement gap Tgap (and interruption gap Igap) for MCG starts at the No. 0 subframe of the second radio frame and ends at the end of the No. 5 subframe.

Table 1 below shows gap pattern configurations supported by a UE in accordance with some embodiments. Table 1 may be considered to replace Table 8.1.2.1-1 in TS 36.133 specification.

TABLE 1

| Gap Pattern Id | InterruptionGap Length (IGL, ms) | MeasurementGap Length (MGL, ms) | Measurement Gap Repetition Period (MGRP, ms) | Minimum available time for inter-frequency and inter-RAT measurements during 480 ms period A. (Tinter 1, ms) | Measurement Purpose |
|---|---|---|---|---|---|
| 0 | 6 | 6 | 40 | 60 | Inter-Frequency E-UTRAN FDD and TDD, UTRAN FDD, GERAN, LCR TDD, HRPD, CDMA2000 1x |
| 1 | 6 | 6 | 80 | 30 | Inter-Frequency E-UTRAN FDD and TDD, UTRAN FDD, GERAN, LCR TDD, HRPD, CDMA2000 1x |
| 2 | 6 + 1 | 6 | 40 | 60 | Inter frequency in dual connectivity for SCG |
| 3 | 6 + 1 | 6 | 80 | 30 | Inter frequency in dual connectivity for SCG |

In an embodiment, an SFN and subframe boundary alignment may be performed by MeNB 110 prior to the configuration of the gaps, so that the timing difference between MCG and SCG does not go beyond the range of ±0.5 ms. The specific operation to perform the SFN and subframe boundary alignment is known to those skilled in the art and thus will not be described in detail.

In case that MCG is ahead of SCG, and the timing offset OF1 is 0.5 ms, for example, the interruption gap for SCG can be configured so that the index of its first subframe is one (1) ahead of that of the interruption gap for MCG. Such an example is provided in the second row of FIG. 5, and it can be seen that the interruption gap Igap for SCG starts at the No. 9 subframe of the first radio frame. In case that MCG is ahead of SCG but the timing offset OF2 is less than 0.5 ms, for example, 0~0.5 ms, the interruption gap for SCG can also be configured so that the index of its first subframe is immediately ahead of that of the interruption gap for MCG. This is shown in the third row of FIG. 5, where MCG is about 0.25 ms ahead of SCG, and the interruption gap Igap for SCG starts also at the No. 9 subframe of the first radio frame. In case that SCG is ahead of MCG, however, the interruption gap for SCG can be configured so that the index of its first subframe is the same as that of the interruption gap for MCG. For example, in the bottom row of FIG. 5, the interruption gap Igap for SCG starts at the No. 0 subframe of the second radio frame.

In the illustrated embodiments, the measurement gaps for MCG and SCG may each be the same and may each include a time period for the actual measurement (Tmeas), and two margins at the beginning and the end of Tmeas respectively. The period Tmeas can be for example 5 ms, and each of the margins can be for example 0.5 ms. Of course other duration for the margins may also be used. In a further embodiment, the leading margin of the measurement gap for MCG may be substantially aligned with that for SCG.

FIG. 6 illustrates a method 600 for wireless communication in accordance with various embodiments of the disclosure. At 610, MeNB 110 may set first configuration information of gaps for MCG associated with MeNB 110. The first configuration information may specify a gap length and a starting point of the measurement gap. The gap length may be 6 ms as specified in Table 1, and the starting point can be determined using a conventional measurement gap configuration procedure. For example, Section 5.5.2.9 of TS 36.331 specification provides a procedure to determine the starting point (SFN and subframe) based on the MeasGapConfig information element, and is reproduced below:

========Start========
5.5.2.9 Measurement gap configuration
The UE shall:
   1> if measGapConfig is set to setup:
      2> if a measurement gap configuration is already setup, release the measurement gap configuration;
      2> setup the measurement gap configuration indicated by the measGapConfig in accordance with the received gapOffset, i.e., the first subframe of each gap occurs at an SFN and subframe meeting the following condition (SFN and subframe of MCG cells):
         SFN mod T = FLOOR(gapOffset/10);
         subframe = gapOffset mod 10;
         with T = MGRP/10 as defined in TS 36.133 [16];
NOTE: The UE applies a single gap, which timing is relative to the MCG cells, even when configured with DC.

```
1> else:
   2>    release the measurement gap configuration;
========End========
```

At 620, MeNB 110 may set second configuration information of gaps for SCG associated with SeNB 120. The second configuration information may enable SeNB 120 to determine a gap length and a starting point of the measurement/interruption gaps for the SCG. As described above, MeNB 110 and SeNB 120 may provide asynchronous dual-connectivity capability and thus may have a different SFN. According to the embodiment, in case of asynchronous dual-connectivity, the gap length of the interruption gap for the SCG may be greater than that of the measurement gaps for the SCG and MCG; otherwise the gap length of the interruption gap for the SCG may be the same as that of the measurement gaps. For example, the gap length of the interruption gap can be greater than that of the measurement gaps by one subframe, which is 7 ms in the context of Table 1. In addition, the starting point of the interruption gap may be ahead of that of the measurement gaps by less than one subframe.

At 630, MeNB 110 may transmit one or more messages including the first configuration information and the second configuration information to UE 130 and/or SeNB 120. For example, the first configuration information can be transmitted to UE 130 through Radio Resource Control (RRC) signaling, and may include a MeasGapConfig information element such as, for example, defined in TS 36.331 specification as reproduced below.

appropriately start inter-frequency measurements. It is also possible to provide SeNB 120 with gap configuration information for measurement/interruption gaps of SCG so that the measurement gaps can be aligned between MCG and SCG. This ensures that UE 130 can always carry out measurements within a gap during which both MeNB 110 and SeNB 120 are prohibited from transmission/reception, and report the measurement results to MeNB 110 and SeNB 120. In addition, though described as performed by MeNB 110, those of ordinary skill in the art will appreciate that the operations of the method 600 may be performed by suitable components of MeNB 110 in software, hardware, firmware, or any combination thereof. For example, a processor or controller of MeNB 110, or one or more chipset(s) in the processor or controller, may be operable to perform some or all the operations of the method 600. As another example, MeNB 110 may comprise one or more non-transitory, computer-readable media having instructions stored thereon, the instructions when executed by one or more processors cause MeNB 110 to perform some or all of the operations of the method 600.

In the method 600, the starting point of the gaps may be specified by an SFN and a subframe number, and MeNB 110 may perform an SFN and subframe boundary alignment between MeNB 110 and SeNB 120. The SFN and subframe

```
========Start========
                        MeasGapConfig information element
-- ASN1START
MeasGapConfig ::=              CHOICE {
    release                        NULL,
    setup                          SEQUENCE {
        gapOffset                      CHOICE {
                gp0
            INTEGER (0..39),
                gp1
            INTEGER (0..79),
                ...
        }
    }
}
-- ASN1STOP
                        MeasGapConfig field descriptions
 gapOffset
 Value gapOffset of gp0 corresponds to gap offset of Gap Pattern Id "0" with MGRP = 40ms,
 gapOffset of gp1 corresponds to gap offset of Gap Pattern Id "1" with MGRP = 80ms. Also
 used to specify the measurement gap pattern to be applied, as defined in TS 36.133.
========End========
```

The second configuration information may be transmitted to SeNB 120 for example via the backhaul. In an embodiment, the second configuration information may include the gap length and timing information of the measurement gap Tgap and interruption gap Igap for SCG so that SeNB 120 is able to configure the measurement and interruption gaps for SCG in accordance with the embodiments described above with reference to FIG. 5. In accordance with various embodiments, the timing information of the gaps for SCG may include a timing offset between MeNB 110 and SeNB 120.

With the method 600, it is possible to provide UE 130 with gap configuration information that allows UE 130 to boundary alignment may limit the timing difference between MCG and SCG within ±0.5 ms.

In the method 600, MeNB 110 may determine a difference between a subframe timing of MeNB 110 and a subframe timing of SeNB 120. This may be done at any appropriate time, for example before or after transmitting the message(s) including the first configuration information to UE 130. In response to the difference indicating that the subframe timing of MeNB 110 is ahead of the subframe timing of SeNB 120, MeNB 110 may set the second configuration information so that the subframe number of the subframe on which the interruption gap of the SCG will start is immediately ahead of the subframe number of the subframe on which the measurement gap will start. Alternatively, in response to the difference indicating that the subframe timing of MeNB 110 is not ahead of the subframe timing of SeNB 120, MeNB 110 may set the second configuration information so that the subframe number of the subframe on which the interruption gap will start is equal to the subframe number of the subframe on which the measurement gap will start. While the above discusses the MeNB 110 setting the second configuration to indicate the starting subframe number of the interruption gap, in other embodiments, the SeNB 120 may determine this based on, e.g., measurement gap information, gap length of the interruption gap, and/or timing information. Some or all of this information may be included in the second configuration information In the method 600, the measurement gaps may each include a first protective margin, a measurement period following the first protective margin, and a second protective margin following the measurement period. For example, each measurement gap may include a 0.5 ms margin, followed by a 5 ms measurement period, and followed in turn by another 0.5 ms margin as shown in FIG. 5. In a further embodiment, the first protective margin of the first measurement gap may be substantially aligned with the first protective margin of the second measurement gap.

Figure 7:
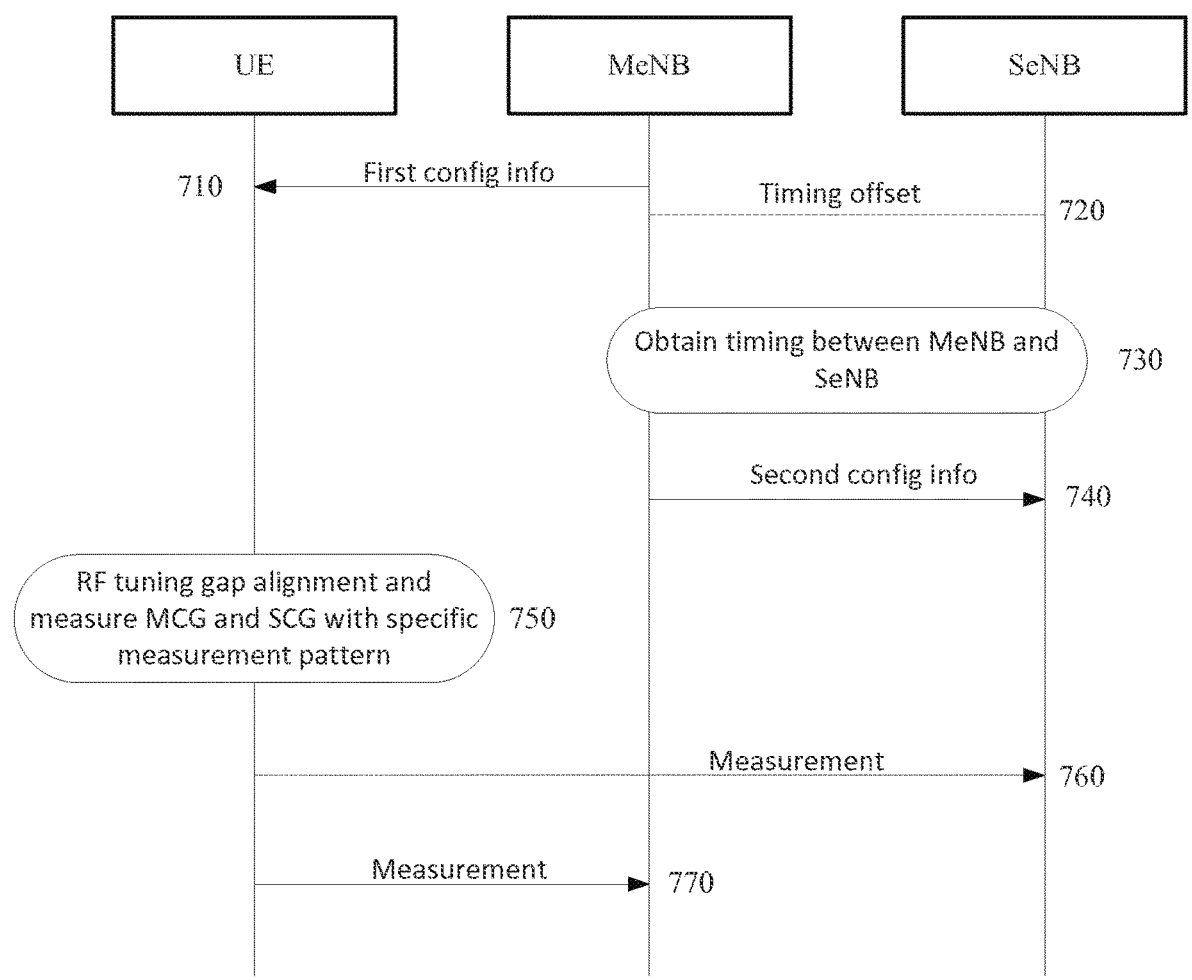
FIG. 7 illustrates a flowchart in accordance with various embodiments of the disclosure.

FIG. 7 illustrates a flow chart 700 in accordance with various embodiments. The flow chart 700 includes, at 710, an MeNB, e.g., MeNB 110, transmitting first configuration information to a UE, e.g., UE 130. The first configuration information may provide information to the UE, e.g., MeasGapConfig IE, that allows the UE to determine measurement gaps that may be used to provide measurements, e.g., inter-frequency measurements, for the MCG and the SCG, similar to that described above with respect to FIG. 6.

The flow chart further includes, at 720 and 730, the MeNB and the SeNB, e.g., SeNB 120, performing a timing offset and obtaining timing between the MeNB and the SeNB. In this manner, the MeNB may perform an SFN and subframe boundary alignment so that the timing difference between subframe boundaries of the MCG and SCG does not go beyond the range of ±0.5 ms. Further, the MeNB/SeNB may also determine the relationship between the subframe timing of the SeNB and the MeNB in order to inform the decision of which subframe is to be the start of the interruption gap of the SCG.

The flow chart 700 further includes, at 740, the MeNB transmitting the second configuration information to the SeNB. As discussed above, the second configuration information may include information that allows the SeNB to determine interruption and measurement gaps. In some embodiments, the second configuration information may include measurement gap information, similar to that provided in MeasGapConfig IE, and an indication of an interruption gap length. The SeNB may use this information to determine a starting subframe of the interruption gap. In some embodiments, the starting subframe of the interruption gap may also be included in the second configuration information transmitted from the MeNB to the SeNB.

The flowchart 700 may further include, at 750, the UE performing an RF tuning gap alignment and measurement of MCG and SCG with specific measurement patterns provided in the first configuration information. The UE may tune its RF circuitry at a beginning of the determined measurement gap period for both MCG and SCG measurements. The SCG measurements may be transmitted to the SeNB at 760 and the MCG measurements may be transmitted to the MeNB at 770.

Figure 8A:
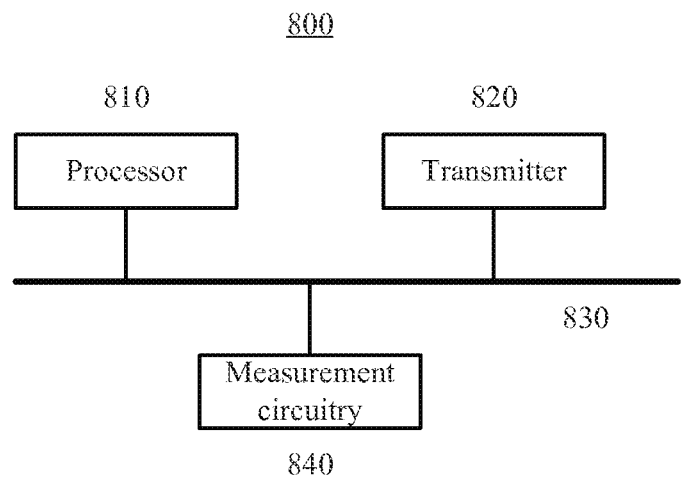
FIG. 8A illustrates a simplified block diagram of an evolved Node B (eNodeB) in accordance with various embodiments of the disclosure.

FIG. 8A illustrates a simplified block diagram of an eNodeB 800 in accordance with various embodiments of the disclosure. The eNodeB 800 may be implemented as MeNB 110 of FIG. 1. As shown in FIG. 8A, the eNodeB 800 includes a processor 810. The processor 810 may include one or more single-core or multi-core processors, and may include any combination of general-purpose processors and dedicated processors (e.g. graphics processors, application processors, baseband processors, etc.). The eNodeB 800 further includes a transmitter 820. The transmitter 820 may be coupled to the processor 810, for example via a bus 830.

The processor 810 may be configured to carry out some or all operations of the method 600, and may be configured to implement the gap configurations described above with reference to FIG. 5. For example, the processor 810 may be configured to set first configuration information of a measurement gap for MCG and SCG associated with the eNodeB 800, and to set second configuration information of gaps for SCG associated with an SeNB so that the interruption gap starts not later than, and ends later than, the measurement gap. The transmitter 820 may be configured to transmit one or more messages including the first configuration information and the second configuration information to a UE and SeNB, respectively. For example, the measurement gap may have a gap length of 6 subframes, the interruption gap may have a gap length of 7 subframes, and the interruption gap may start earlier than the measurement gap by less than one subframe. The SeNB may be implemented as SeNB 120 of FIG. 1, and the eNodeB 800 may be configured to provide asynchronous dual connectivity capability in an LTE network with the SeNB.

In an embodiment, the eNodeB 800 may further include a measurement circuitry 840 configured to determine a difference between a subframe timing of the eNodeB 800 and the subframe timing of the second SeNB. In some embodiments, the measurement circuitry 840 may perform a boundary alignment based on the determined difference. The eNodeB may include any other components known to those skilled in the art.

Figure 8B:
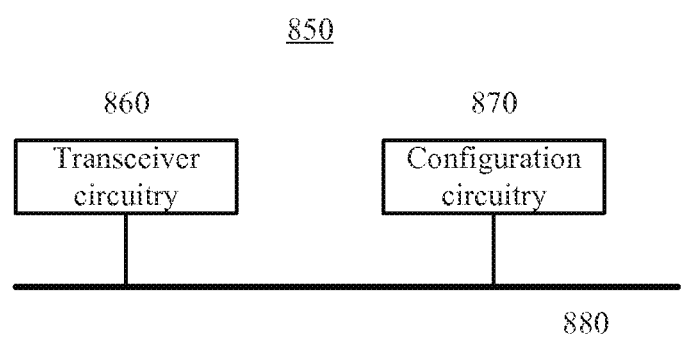
FIG. 8B illustrates a simplified block diagram of an evolved Node B (eNodeB) in accordance with various embodiments of the disclosure.

FIG. 8B illustrates a simplified block diagram of an eNodeB 850 in accordance with various embodiments of the disclosure. The eNodeB 850 may be implemented as SeNB 120 of FIG. 1. As shown in FIG. 8B, the eNodeB 850 may include transceiver circuitry 860 operable to perform data transmission/reception with a UE, e.g. UE 130, over a wireless communication interface, and MeNB over a backhaul communication interface. The eNodeB 850 may include configuration circuitry 870 operable to determine an interruption gap during which the data transmission/reception with the UE is prohibited. The configuration circuitry 870 may be connected with the transceiver 860 in any manner known to a person skilled in the art, e.g. via a bus 880. In the eNodeB 850, the interruption gap may be determined based on configuration information received from an MeNB, e.g. MeNB 110. The configuration information may be received via the transceiver 860 or other receiving circuitry in the eNodeB 850. The interruption gap may have a gap length of 7 ms in case of asynchronous connection between the eNodeB 750 and the MeNB, and may have a gap length of 6 ms otherwise.

Figure 9:
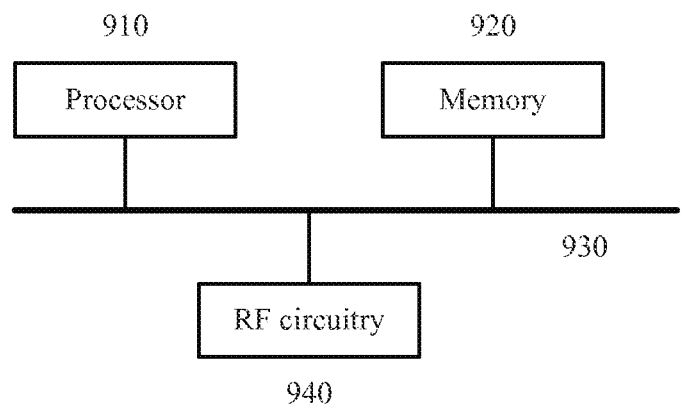
FIG. 9 illustrates a simplified block diagram of a wireless communication apparatus in accordance with various embodiments of the disclosure.

FIG. 9 illustrates a simplified block diagram of UE 130 of FIG. 1 in accordance with various embodiments of the disclosure. As shown in FIG. 9, UE 130 includes a processor 910, radio frequency (RF) circuitry 940 and a memory 930. The processor 910 may include one or more single-core or multi-core processors, and may include any combination of general-purpose processors and dedicated processors (e.g.

graphics processors, application processors, baseband processors, etc.). In accordance with various embodiments, the processor 910 (and in particular, a baseband chipset of the processor 910) may include configuration logic and RF control logic. The configuration logic may be operable to determine, based on one or more configuration information messages, gap information for MeNB 110 and SeNB 120 that may be asynchronous with MeNB 110, and to determine, based on the gap information, measurement/interruption gaps for MeNB 110 and SeNB 120. The RF control circuitry may be operable to tune, based on the measurement gap information, the RF circuitry 940 to perform inter-frequency measurements. The tuning of the RF circuitry 940 may be performed at the beginning of the measurement gap. For example, the configuration circuitry may extract MeasGapConfig information element(s) from a MeasConfig information element received from MeNB 110, and determine the configuration of the measurement gaps for MeNB 110 and SeNB 120 based on these information element(s). MeNB 110 and SeNB 120 may have measurement gap lengths of six subframes, and SeNB 120 may have an interruption gap length of seven subframes. These gap lengths may be specified in the measurement gap information or set in any other manner. The measurement gap configuration described with reference to FIG. 5 may be applied.

In accordance with various embodiments of the disclosure, the RF control circuitry may be further configured to re-tune the RF circuitry 940 to transmit or receive data in the serving cell of the SCG or the MCG. In accordance with various embodiments of the disclosure, the time from start of tuning to end of re-tuning may be aligned between the MCG and the SCG.

The RF circuitry 940 may be coupled to the processor 910, for example via a bus 930, and may be used to transmit or receive data in a serving cell of a MCG associated with MeNB 110 and in a serving cell of a SCG associated with SeNB 120. The RF circuitry 940 may be tuned to a specified frequency under the control of the processor 910 to perform measurements, including inter-frequency measurements.

The memory 920 may include one or more non-transitory, computer-readable media having instructions stored thereon, and the instructions when executed by the processor 910 may cause UE 130 to perform the operations described above in connection with the processor 910. However, this is only illustrative rather than limiting; those of ordinary skill in the art will appreciate alternative implementations in software, hardware, firmware, or any combination thereof.

Figure 10:
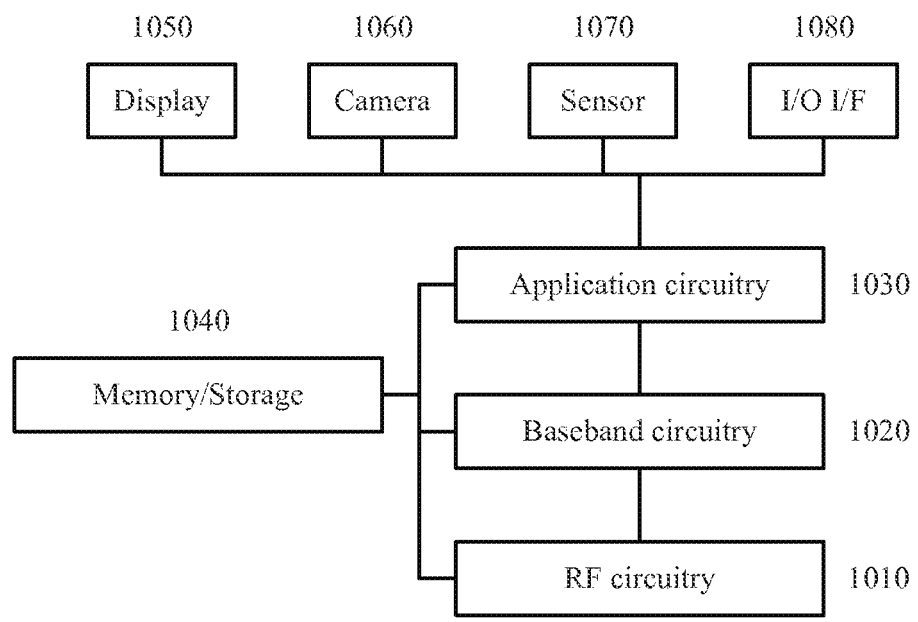
FIG. 10 illustrates a general block diagram of a wireless communication system in accordance with various embodiments of the disclosure.

Embodiments described herein may be implemented into a system using any suitably configured hardware and/or software. FIG. 10 illustrates a general block diagram of a wireless communication system 1000 in accordance with various embodiments of the disclosure including radio frequency (RF) circuitry 1010, baseband circuitry 1020, application circuitry 1030, memory/storage 1040, display 1050, camera 1060, sensor 1070, and input/output (I/O) interface 1080, coupled with each other at least as shown. The wireless communication system 1000 may implement an embodiment of UE 130 of FIG. 1.

The application circuitry 1030 may include circuitry such as, but not limited to, one or more single-core or multi-core processors. The processor(s) may include any combination of general-purpose processors and dedicated processors (e.g., graphics processors, application processors, etc.). The processors may be coupled with memory/storage 1040 and configured to execute instructions stored in the memory/storage 1040 to enable various applications and/or operating systems running on the system.

The baseband circuitry 1020 may include circuitry such as, but not limited to, one or more single-core or multi-core processors. The processor(s) may include a baseband processor. The baseband circuitry 1020 may handle various radio control functions that enable communication with one or more radio networks via the RF circuitry 1010. The radio control functions may include, but are not limited to, signal modulation, encoding, decoding, radio frequency shifting, etc. In some embodiments, the baseband circuitry 1020 may provide for communication compatible with one or more radio technologies. For example, in some embodiments, the baseband circuitry 1020 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 1020 is configured to support radio communications of more than one wireless protocol may be referred to as multi-mode baseband circuitry. In various embodiments, the baseband circuitry 1020 may include circuitry to operate with signals that are not strictly considered as being in a baseband frequency. For example, in some embodiments, the baseband circuitry 1020 may include circuitry to operate with signals having an intermediate frequency, which is between a baseband frequency and a radio frequency.

RF circuitry 1010 may enable communication with wireless networks using modulated electromagnetic radiation through a non-solid medium. In various embodiments, the RF circuitry 1010 may include switches, filters, amplifiers, etc. to facilitate the communication with the wireless network. In various embodiments, the RF circuitry 1010 may include circuitry to operate with signals that are not strictly considered as being in a radio frequency. For example, in some embodiments, the RF circuitry 1010 may include circuitry to operate with signals having an intermediate frequency, which is between a baseband frequency and a radio frequency.

In various embodiments, the above-described components of a UE or eNodeB (e.g., processor 710 or 810, transmitter 720, measurement circuitry 740, memory 820, or RF circuitry 840) may be embodied in whole or in part in one or more of the RF circuitry 1010, the baseband circuitry 1020, and/or the application circuitry 1030. As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules.

The memory/storage 1040 may be used to load and store data and/or instructions, for example, for system. The memory/storage 1040 for one embodiment may include any combination of suitable volatile memory (e.g., dynamic random access memory (DRAM)) and/or non-volatile memory (e.g., Flash memory).

In some embodiments, some or all of the constituent components of the baseband circuitry 1020, the application circuitry 1030, and/or the memory/storage 1040 may be implemented together on a system on a chip (SOC).

In various embodiments, the I/O interface 1080 may include one or more user interfaces designed to enable user interaction with the system 1000 and/or peripheral component interfaces designed to enable peripheral component interaction with the system 1000. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 1070 may include one or more sensing devices to determine environmental conditions and/or location information related to the system 1000. In some embodiments, the sensor 1070 may include, but are not limited to, a gyro sensor, an accelerometer, a proximity sensor, an ambient light sensor, and/or a positioning unit. The positioning unit may also be part of, or interact with, the baseband circuitry 1020 and/or RF circuitry 1010 to communicate with components of a positioning network, e.g., a global positioning system (GPS) satellite.

In various embodiments, the display 1050 may include a display (e.g., a liquid crystal display, a touch screen display, etc.). In various embodiments, the camera 1060 may include a semiconductor imaging device, e.g. a charge coupled device (CCD) imager and/or a complementary metal-oxide-semiconductor (CMOS) imager.

In various embodiments, the system 1000 may be a mobile computing device such as, but not limited to, a laptop computing device, a tablet computing device, a netbook, an ultrabook™, a smart phone, etc. In various embodiments, the system 1000 may have more or less components, and/or different architectures.

The following paragraphs describe examples of various embodiments.

Example 1 includes an apparatus to be employed in a user equipment (UE), comprising: configuration circuitry operable to: determine, based on one or more configuration information messages, a measurement gap for a master evolved Node B (MeNB) that is operable to provide a master cell group (MCG) that is asynchronous with a secondary cell group (SCG) of a secondary evolved Node B (SeNB), wherein subframe boundaries of the MCG are different from subframe boundaries of the SCG; and radio frequency (RF) control circuitry operable to cause RF circuitry to be tuned, at a beginning of the measurement gap based on a subframe boundary of the MCG, to start inter-frequency measurements, wherein the RF circuitry is to be used to transmit or receive data in a serving cell of the MCG and in a serving cell of the SCG.

Example 2 includes an apparatus of Example 1, wherein the RF control circuitry is further operable to: re-tune, at an end of the measurement gap, the RF circuitry to transmit or receive data in the serving cell of the SCG or the MCG.

Example 3 includes an apparatus of Example 2, wherein the time from start of tuning to end of re-tuning is aligned between the MCG and the SCG.

Example 4 includes an apparatus of any one of Examples 1-3, wherein the measurement gap for the MeNB comprises a first protective margin, a measurement period following the first protective margin, and a second protective margin following the measurement period.

Example 5 includes an apparatus of Example 4, wherein the first protective margin of the measurement gap for the MeNB is substantially aligned with the first protective margin of the measurement gap for the SeNB, and the second protective margin of the measurement gap for the MeNB is substantially aligned with the second protective margin of the measurement gap for the SeNB.

Example 6 includes an apparatus of any one of Examples 1-5, being included in a baseband chipset of the UE.

Example 7 includes an apparatus of any one of Examples 1-6, wherein an interruption gap for the SeNB starts not later than, and ends later than, the measurement gap for the MeNB.

Example 8 includes a master evolved node B (MeNB) comprising: a processor to: set first configuration information of a measurement gap for a master cell group (MCG) associated with the MeNB; and set second configuration information of a gap for a secondary cell group (SCG) associated with a secondary eNodeB (SeNB) so that an interruption gap of the SCG starts earlier than, and ends later than, the measurement gap, wherein the SeNB is operable to be asynchronous with the MeNB; and a transmitter to transmit the first configuration information to a user equipment (UE) and the second configuration information to the SeNB.

Example 9 includes an MeNB of Example 8, wherein the first measurement gap has a gap length of 6 subframes, and the second measurement gap has a gap length of 7 subframes.

Example 10 includes an MeNB of any one of Examples 8-9, wherein the first configuration information specifies a starting point of the measurement gap by a first system frame number (SFN) and a first subframe number, and the second configuration information specifies a starting point of the interruption gap by a second SFN and a second subframe number, and the processor is further to perform an SFN and subframe boundary alignment between the MeNB and the SeNB.

Example 11 includes an MeNB of Example 10, further comprising measurement circuitry to determine a difference between a subframe timing of the MeNB and the subframe timing of the SeNB, and the processor is further to: set, in response to the difference indicating that the subframe timing of the MeNB is ahead of the subframe timing of the SeNB, the second configuration information so that the second subframe number is immediately ahead of the first subframe number, and set, in response to the difference indicating that the subframe timing of the MeNB is not ahead of the subframe timing of the SeNB, the second configuration information so that the second subframe number is equal to the first subframe number.

Example 12 includes an MeNB of any one of Examples 8-11, wherein the measurement gap comprises a first protective margin, a measurement period following the first protective margin, and a second protective margin following the measurement period.

Example 13 includes an MeNB of Example 12, wherein the first protective margin of the measurement gap is substantially aligned with a first protective margin of a second measurement gap for the SeNB.

Example 14 includes one or more non-transitory, computer-readable media having instructions stored thereon, the instructions when executed by one or more processors cause a master evolved Node B (MeNB) to: set first configuration information of a measurement gap for the MeNB, the first configuration information to specify a gap length and a starting point of the first measurement gap; set second configuration information of an interruption gap for a secondary evolved Node B (SeNB) asynchronous with the MeNB, the second configuration information to specify a gap length of the interruption gap; and transmit one or more messages including the first configuration information and the second configuration information, wherein the gap length of the interruption gap is greater than the gap length of the measurement gap.

Example 15 includes the one or more non-transitory, computer-readable media of Example 14, wherein a starting point of interruption gap is even with the starting point of the measurement gap or ahead of the starting point of the measurement gap by less than a duration of one subframe.

Example 16 includes one or more non-transitory, computer-readable media of any one of Examples 14-15, wherein the gap length of the measurement gap is 6 subframes, and the gap length of the interruption gap is 7 subframes.

Example 17 includes one or more non-transitory, computer-readable media of any one of Examples 14-16, wherein the starting point of the measurement gap is specified by a first system frame number (SFN) and a first subframe number, the starting point of the interruption gap is specified by a second SFN and a second subframe number, and the instructions when executed by the one or more processors further cause the MeNB to: perform an SFN and subframe boundary alignment between the MeNB and the SeNB.

Example 18 includes one or more non-transitory, computer-readable media of any one of Examples 14-17, wherein the starting point of the measurement gap is specified by a first system frame number (SFN) and a first subframe number, the starting point of the interruption gap is specified by a second SFN and a second subframe number, and the instructions when executed by the one or more processors further cause the MeNB to: determine a difference between a subframe timing of the MeNB and a subframe timing of the SeNB; and set, in response to the difference indicating that the subframe timing of the MeNB is ahead of the subframe timing of the SeNB, the second configuration information so that the second subframe number is immediately ahead of the first subframe number.

Example 19 includes one or more non-transitory, computer-readable media of any one of Examples 14-18, wherein the starting point of the measurement gap is specified by a first system frame number (SFN) and a first subframe number, the starting point of the interruption gap is specified by a second SFN and a second subframe number, and the instructions when executed by the one or more processors further cause the MeNB to: set, in response to the difference indicating that the subframe timing of the MeNB is not ahead of the subframe timing of the SeNB, the second configuration information so that the second subframe number is equal to the first subframe number.

Example 20 includes one or more non-transitory, computer-readable media of any one of Examples 14-19, wherein the interruption gap comprises a second measurement gap, and the measurement gap and the second measurement gap each comprise a respective first protective margin, a measurement period following the first protective margin, and a second protective margin following the measurement period.

Example 21 includes one or more non-transitory, computer-readable media of Example 20, wherein the first protective margin of the measurement gap is substantially aligned with the first protective margin of the second measurement gap.

Example 22 includes a method for wireless communication, comprising: setting, by a master evolved Node B (MeNB) in a Long Term Evolution (LTE) network, first configuration information of a first measurement gap for the MeNB, the first configuration information specifying a gap length and a starting point of the first measurement gap; setting, by the MeNB, second configuration information of a second measurement gap for a secondary evolved Node B (SeNB) asynchronous with the MeNB, the second configuration information specifying a gap length and a starting point of the second measurement gap; and transmitting, by the MeNB, one or more messages including the first configuration information and the second configuration information, wherein the gap length of the second measurement gap is greater than the gap length of the first measurement gap, and the starting point of the second measurement gap is even with the starting point of the first measurement gap or ahead of the starting point of the first measurement gap by less than one subframe.

Example 23 includes a method of Example 22, wherein the gap length of the first measurement gap is 6 subframes, and the gap length of the second measurement gap is 7 subframes.

Example 24 includes a method of Example 22, wherein the starting point of the first measurement gap is specified by a first system frame number (SFN) and a first subframe number, the starting point of the second measurement gap is specified by a second SFN and a second subframe number, and the method further comprises: performing, by the MeNB, an SFN and subframe boundary alignment between the MeNB and the SeNB.

Example 25 includes a method of Example 24, wherein the method further comprises: determining, by the MeNB, a difference between a subframe timing of the MeNB and a subframe timing of the SeNB; setting, in response to the difference indicating that the subframe timing of the MeNB is ahead of the subframe timing of the SeNB, the second configuration information so that the second subframe number is immediately ahead of the first subframe number; and setting, in response to the difference indicating that the subframe timing of the MeNB is not ahead of the subframe timing of the SeNB, the second configuration information so that the second subframe number is equal to the first subframe number.

Example 26 includes a method of Example 22, wherein the first measurement gap and the second measurement gap each respectively comprise a first protective margin, a measurement period following the first protective margin, and a second protective margin following the measurement period, and wherein the first protective margin of the first measurement gap is substantially aligned with the first protective margin of the second measurement gap.

Example 27 includes an evolved node B (eNodeB) comprising: transceiver circuitry operable to perform data transmission or reception with a user equipment (UE); and configuration circuitry operable to determine an interruption gap during which the data transmission or reception with the UE is prohibited, wherein the interruption gap has a gap length of 7 ms and a measurement gap has a gap length of 6 ms.

Example 28 includes the eNodeB of Example 27, wherein the eNodeB is a secondary eNodeB (SeNB) operable to be asynchronous with a master eNodeB (MeNB).

Example 29 includes the eNodeB of any Example 28, wherein the eNodeB is connected with the MeNB with non-ideal backhaul.

Example 30 includes the eNodeB of any one of Examples 27-29, wherein the interruption gap is determined based on configuration information received from a master eNodeB (MeNB).

Example 31 includes an apparatus for wireless communication used in a user equipment (UE), comprising: means for determining, based on one or more configuration information messages, measurement gap information for a master evolved Node B (MeNB) and a secondary evolved Node B (SeNB) that is asynchronous with the MeNB; means for determining, based on the measurement gap information, measurement gaps for the MeNB and the SeNB, wherein the MeNB and SeNB have measurement gap lengths of six subframes and the SeNB has an interruption gap length of seven subframes; and means for tuning, based on the measurement gap information, a radio frequency (RF) circuitry, which is used to transmit or receive data in a serving cell of a master cell group (MCG) associated with the MeNB and in a serving cell of a secondary cell group (SCG) associated with the SeNB, to perform inter-frequency measurements.

Example 32 includes an apparatus of Example 31, wherein the measurement gaps for the MeNB and the SeNB are substantially aligned.

Example 33 includes an apparatus of any one of Examples 31-32, further comprising: means for re-tuning the RF circuitry to transmit or receive data in the serving cell of the SCG or the MCG.

Example 34 includes an apparatus for wireless communication used in an evolved Node B (eNodeB), comprising: means for setting first configuration information of a measurement gap for a master cell group (MCG) associated with the eNodeB; and means for setting second configuration information of an interruption gap for a secondary cell group (SCG) associated with a second eNodeB so that the interruption gap starts not later than, and ends later than, the measurement gap, wherein the eNodeB is a master evolved Node B (MeNB) and the second eNodeB is a secondary evolved Node B (SeNB) asynchronous with the MeNB.

Example 35 includes an apparatus of Example 34, wherein the measurement gap has a gap length of 6 subframes, and the interruption gap has a gap length of 7 subframes.

Example 36 includes an apparatus of any one of Examples 34-35, wherein the first configuration information specifies a starting point of the measurement gap by a first system frame number (SFN) and a first subframe number, and the second configuration information specifies a starting point of the interruption gap by a second SFN and a second subframe number, and wherein the apparatus further comprises means for performing an SFN and subframe boundary alignment between the MeNB and the SeNB.

Example 37 includes an apparatus of Example 36, further comprising: means for determining a difference between a subframe timing of the MeNB and the subframe timing of the SeNB; means for setting, in response to the difference indicating that the subframe timing of the MeNB is ahead of the subframe timing of the SeNB, the second configuration information so that the second subframe number is immediately ahead of the first subframe number; and means for setting, in response to the difference indicating that the subframe timing of the MeNB is not ahead of the subframe timing of the SeNB, the second configuration information so that the second subframe number is equal to the first subframe number.

Example 38 includes an apparatus of any one of Examples 34-37, wherein the measurement gap comprises a first protective margin, a measurement period following the first protective margin, and a second protective margin following the measurement period.

Example 39 includes an apparatus of Example 38, wherein the first protective margin of the measurement gap is substantially aligned with a first protective margin of a second measurement gap.

Example 40 includes an apparatus for wireless communication used in a master evolved Node B (MeNB), comprising: means for setting first configuration information of a measurement gap for the MeNB, the first configuration information to specify a gap length and a starting point of the measurement gap; means for setting second configuration information of an interruption gap for a secondary evolved Node B (SeNB) asynchronous with the MeNB, the second configuration information to specify a gap length and a starting point of the interruption gap; and means for transmitting one or more messages including the first configuration information and the second configuration information, wherein the gap length of the interruption gap is greater than the gap length of the measurement gap, and the starting point of the interruption gap is even with the starting point of the first measurement gap, or ahead of the starting point of the first measurement gap by less than a duration of one subframe.

Example 41 includes an apparatus of Example 40, wherein the measurement gap corresponds to a master cell group (MCG) and the interruption gap corresponds to a secondary cell group (SCG).

Example 42 includes an apparatus of any one of Examples 40-41, wherein the gap length of the measurement gap is 6 subframes, and the gap length of the interruption gap is 7 subframes.

Example 43 includes an apparatus of any one of Examples 40-42, wherein the starting point of the measurement gap is specified by a first system frame number (SFN) and a first subframe number, the starting point of the interruption gap is specified by a second SFN and a second subframe number, and the apparatus further comprises: means for performing an SFN and subframe boundary alignment between the MeNB and the SeNB.

Example 44 includes an apparatus of any one of Examples 40-43, wherein the starting point of the measurement gap is specified by a first system frame number (SFN) and a first subframe number, the starting point of the interruption gap is specified by a second SFN and a second subframe number, and wherein the apparatus further comprises: means for determining a difference between a subframe timing of the MeNB and a subframe timing of the SeNB; and means for setting, in response to the difference indicating that the subframe timing of the MeNB is ahead of the subframe timing of the SeNB, the second configuration information so that the second subframe number is immediately ahead of the first subframe number.

Example 45 includes an apparatus of any one of Examples 40-44, wherein the starting point of the measurement gap is specified by a first system frame number (SFN) and a first subframe number, the starting point of the interruption gap is specified by a second SFN and a second subframe number, and wherein the apparatus further comprises: means for setting, in response to the difference indicating that the subframe timing of the MeNB is not ahead of the subframe timing of the SeNB, the second configuration information so that the second subframe number is equal to the first subframe number.

Example 46 includes an apparatus of any one of Examples 40-45, wherein the measurement gap comprises a respective first protective margin, a measurement period following the first protective margin, and a second protective margin following the measurement period.

Example 47 includes an apparatus of Example 46, wherein the first protective margin of the first measurement gap is substantially aligned with a first protective margin of a second measurement gap.

Example 48 include one or more non-transitory, computer-readable media having instructions stored thereon, the instructions when executed by one or more processors cause a user equipment (UE) to: determine a measurement gap for a master evolved Node B (MeNB that is operable to provide a master cell group (MCG) that is asynchronous with a secondary cell group (SCG) of a secondary evolved Node B (SeNB): and tune RF circuitry of the UE to start inter-frequency measurements at a start of the measurement gap for measurements in both the MCG and the SCG, wherein the start of the measurement gap is based on a subframe timing of the MCG.

Example 49 includes the one or more non-transitory, computer-readable media of Example 48, wherein the instructions when executed further cause the UE to: re-tune, at an end of the measurement gap, the RF circuitry to transmit or receive data in the serving cell of the SCG or the MCG.

Example 50 includes the one or more non-transitory, computer-readable media of claim 49, wherein a time from start of tuning to end of re-tuning is aligned between the MCG and the SCG.

Example 51 includes the one or more non-transitory, computer-readable media of claim 48, wherein the measurement gap for the MeNB comprises a first protective margin, a measurement period following the first protective margin, and a second protective margin following the measurement period.

Example 52 includes the one or more non-transitory, computer-readable media of claim 48, being included in a baseband chipset of the UE.

Example 53 includes the one or more non-transitory, computer-readable media of claim 48, wherein an interruption gap for the SeNB starts not later than, and ends later than, the measurement gap for the MeNB.

Example 54 includes a method of communicating in a wireless network as shown and described in the description.

Example 55 includes a system for providing wireless communication as shown and described in the description.

Example 56 includes a device for providing wireless communication as shown and described in the description.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the Examples and the equivalents thereof.

What is claimed is:

1. An apparatus to be employed in a user equipment (UE), comprising:
configuration circuitry to: determine, based on one or more configuration information messages, a measurement gap for a master evolved Node B (MeNB) that is to provide a master cell group (MCG) that is asynchronous with a secondary cell group (SCG) of a secondary evolved Node B (SeNB), wherein subframe boundaries of the MCG are offset from subframe boundaries of the SCG, wherein a starting point of the measurement gap has a first system frame number (SFN) and a first subframe number, wherein a starting point of an interruption gap for the SeNB has a second SFN and a second subframe number, and wherein subframe timing of the MeNB is ahead of subframe timing of the SeNB such that the second subframe number is immediately ahead of the first subframe number; and
radio frequency (RF) control circuitry to:
tune, at a beginning of the measurement gap based on a subframe boundary of the MCG and independent of a subframe boundary of the SCG, RF circuitry to start inter-frequency measurements, wherein the RF circuitry is to transmit or receive data in a serving cell of the MCG and in a serving cell of the SCG; and
re-tune, at an end of the measurement gap, the RF circuitry to transmit or receive data in the serving cell of the SCG or the MCG, wherein a time from a start of the tuning to an end of the re-tuning is aligned between the MCG and the SCG.

2. The apparatus of claim 1, wherein the measurement gap for the MeNB comprises a first protective margin, a measurement period following the first protective margin, and a second protective margin following the measurement period.

3. The apparatus of claim 2, wherein the first protective margin of the measurement gap for the MeNB is substantially aligned with a first protective margin of a measurement gap for the SeNB, and the second protective margin of the measurement gap for the MeNB is aligned with a second protective margin of the measurement gap for the SeNB.

4. The apparatus of claim 1, being included in a baseband chipset of the UE.

5. The apparatus of claim 1, wherein an interruption gap for the SeNB starts not later than, and ends later than, the measurement gap for the MeNB.

6. One or more non-transitory, computer-readable media having instructions stored thereon, wherein the instructions when executed by one or more processors cause a user equipment (UE) to:
determine a measurement gap for a master evolved Node B (MeNB) that is to provide a master cell group (MCG) that is asynchronous with a secondary cell group (SCG) of a secondary evolved Node B (SeNB), wherein subframe boundaries of the MCG are offset from subframe boundaries of the SCG, wherein a starting point of the measurement gap has a first system frame number (SFN) and a first subframe number, wherein a starting point of an interruption gap for the SeNB has a second SFN and a second subframe number, and wherein subframe timing of the MeNB is ahead of subframe timing of the SeNB such that the second subframe number is immediately ahead of the first subframe number;
tune RF circuitry of the UE to start inter-frequency measurements at a start of the measurement gap for measurements in both the MCG and the SCG, wherein the start of the measurement gap is based on a subframe timing of the MCG and independent of a subframe timing of the SCG; and
re-tune, at an end of the measurement gap, the RF circuitry to transmit or receive data in the serving cell of the SCG or the MCG, wherein a time from start of tuning to end of re-tuning is aligned between the MCG and the SCG.

7. The one or more non-transitory, computer-readable media of claim 6, wherein the measurement gap for the MeNB comprises a first protective margin, a measurement period following the first protective margin, and a second protective margin following the measurement period.

8. The one or more non-transitory, computer-readable media of claim 6, being included in a baseband chipset of the UE.

9. The one or more non-transitory, computer-readable media of claim 6, wherein an interruption gap for the SeNB starts not later than, and ends later than, the measurement gap for the MeNB.

10. One or more non-transitory, computer-readable media having instructions stored thereon, wherein the instructions when executed by one or more processors cause a master evolved Node B (MeNB) to:
set first configuration information of a measurement gap for the MeNB, the first configuration information to specify a gap length and a starting point of the measurement gap, wherein the starting point of the measurement gap is specified by a first system frame number (SFN) and a first subframe number, the starting point of an interruption gap is specified by a second SFN and a second subframe number;
set second configuration information of an interruption gap for a secondary evolved Node B (SeNB) asynchronous with the MeNB, the second configuration information to specify a gap length of the interruption gap, wherein subframe boundaries of the MeNB are offset from subframe boundaries of the SeNB;
determine a difference between a subframe timing of the MeNB and a subframe timing of the SeNB;
set, in response to the difference indicating that the subframe timing of the MeNB is ahead of the subframe timing of the SeNB, the second configuration information so that the second subframe number is immediately ahead of the first subframe number; and
transmit one or more messages including the first configuration information and the second configuration information,
wherein the gap length of the interruption gap is greater than the gap length of the measurement gap.

11. The one or more non-transitory, computer-readable media of claim 10, wherein a starting point of the interruption gap is even with the starting point of the measurement gap or ahead of the starting point of the measurement gap by less than a duration of one subframe.

12. The one or more non-transitory, computer-readable media of claim 10, wherein the gap length of the measurement gap is 6 subframes, and the gap length of the interruption gap is 7 subframes.

13. The one or more non-transitory, computer-readable media of claim 10, wherein the starting point of the measurement gap is specified by a first system frame number (SFN) and a first subframe number, the starting point of the interruption gap is specified by a second SFN and a second subframe number, and the instructions when executed by the one or more processors further cause the MeNB to:
perform an SFN and subframe boundary alignment between the MeNB and the SeNB.

14. The one or more non-transitory, computer-readable media of claim 10, wherein the interruption gap comprises a second measurement gap, and the measurement gap and the second measurement gap each comprise a respective first protective margin, a measurement period following the first protective margin, and a second protective margin following the measurement period.

15. The one or more non-transitory, computer-readable media of claim 14, wherein the first protective margin of the measurement gap is aligned with the first protective margin of the second measurement gap.

* * * * *